United States Patent [19]
Lesens et al.

[11] Patent Number: 6,022,568
[45] Date of Patent: Feb. 8, 2000

[54] ICE CREAM WITH COATING CONTAINING LACTIC ACID BACTERIA

[75] Inventors: Corinne Lesens, Hellemnes; Christian Dufort, Beauvais, both of France; Andrea M. A. Pfeifer, St-Legier, Germany; Florence Rochat, Montreux, Switzerland

[73] Assignee: Nestec, S.A., Vevey, Switzerland

[21] Appl. No.: 09/254,349

[22] PCT Filed: Jul. 5, 1997

[86] PCT No.: PCT/EP97/03560

§ 371 Date: May 21, 1999

§ 102(e) Date: May 21, 1999

[87] PCT Pub. No.: WO98/09535

PCT Pub. Date: Mar. 12, 1998

[30] Foreign Application Priority Data

Sep. 6, 1996 [CH] Switzerland .......................... 96202479

[51] Int. Cl.$^7$ .............................. A23C 9/127; A23G 9/04
[52] U.S. Cl. .............................. 426/61; 426/42; 426/565; 426/305
[58] Field of Search .............................. 426/61, 42, 305, 426/317, 565

[56] References Cited

U.S. PATENT DOCUMENTS

| | | | |
|---|---|---|---|
| 4,150,163 | 4/1979 | Peterson | 426/660 |
| 4,293,573 | 10/1981 | Bradley, Jr. et al. | 426/43 |
| 4,308,287 | 12/1981 | Kahn et al. | 426/43 |
| 4,985,263 | 1/1991 | Klug et al. | 426/302 |
| 5,112,626 | 5/1992 | Huang et al. | 426/43 |
| 5,296,221 | 3/1994 | Mitsuoka et al. | 424/93 J |
| 5,393,549 | 2/1995 | Badertscher et al. | 426/564 |
| 5,494,664 | 2/1996 | Brassart et al. | 424/93.4 |
| 5,603,930 | 2/1997 | Brassart et al. | 424/93.45 |
| 5,733,765 | 3/1998 | Mollet et al. | 435/183 |
| 5,786,184 | 7/1998 | Mollet et al. | 435/101 |

FOREIGN PATENT DOCUMENTS

| | | |
|---|---|---|
| 0 199 535 | 10/1986 | European Pat. Off. . |
| 0 240 326 | 10/1987 | European Pat. Off. . |
| 0 438 201 | 7/1991 | European Pat. Off. . |
| 0 462 309 | 12/1991 | European Pat. Off. . |
| 0 468 560 | 1/1992 | European Pat. Off. . |
| 0 577 904 | 1/1994 | European Pat. Off. . |
| 0 716 810 | 6/1996 | European Pat. Off. . |
| 0 750 043 | 12/1996 | European Pat. Off. . |
| 2 423 163 | 11/1979 | France . |
| 2 680 635 | 5/1993 | France . |
| 154 424 | 5/1980 | German Dem. Rep. . |
| 684 774 | 12/1994 | Switzerland . |
| WO 95/21536 | 8/1995 | WIPO . |

OTHER PUBLICATIONS

Clementi, "Flavor production in ice cream mix cultured with a citrate fermenting strain of *Lactococcus lactis*", *Milchwissenschaft* 46, No. 11, pp. 696–700 (1991).

Fujisawa et al., "Taxonomic Study of the *Lactobacillus acidophilus* Group, with Recognition of *Lactobacillus gallinarum* sp. Nov. and *Lactobacillus johnsonii* sp. Nov. and Synonymy of *Lactobacillus acidophilus* Group A3 (Johnson et al. 1980) with the Type Strain of *Lactobacillus amylovorus* (Nakamura 1981)", *Inst. J. Syst. Bacteriol.*, vol. 42, No. 3, pp. 487–491 (1992).

Hekmat et al., "Survival of *Lactobacillus acidophilus* and *Bifidobacterium bifidum* in Ice Cream for Use as a Probiotic Food", *J. Dairy Sci.*, vol. 75, No. 6, pp. 1415–1422 (1992).

WPI Acc No. 80–09731C/198006, English–language abstract for FR 2 423 163.

WPI Acc No 82–70334E/198234, English–language abstract for DD 154 424.

Derwent AN—90–028589[04], English–language abstract for SU 1 374 465.

Derwent AN—91–216887/30, English–langage abstract for NL 9000101 and EPO 438 201.

WPI Acc No 93–100570/199312, English–language abstract for FR 2 680 635.

WPI Acc No 95–030799/199505, English–language abstract for CH 684 774.

WPI Acc No. 96–288436/199630, English–language abstract for EP 0 716 810.

*Primary Examiner*—Keith Hendricks
*Attorney, Agent, or Firm*—Pennie & Edmonds LLP

[57] ABSTRACT

Use of lactic acid bacteria in the preparation of a cream intended to coat all or part of an ice cream. The ice cream is an expanded and chilled cream, coated over all or part of its external surface with a non-expanded coating containing $10^3$ to $10^9$ cfu/g of lactic acid bacteria. Preferably, the expanded cream includes more than $10^6$ cfu/g of lactic acid bacteria, the ratio (e/g) between the number of lactic acid bacteria in the coating (e) and the number of lactic acid bacteria in the expanded cream (g) being greater than 1. The coating may include 1% to 70% of a milk fermented by lactic acid bacteria, 0.5% to 5% of animal or vegetable proteins, a lactic fat content of from 2% to 20% and preferably the strain *Lactobacillus acidophilus* CNCM I-1225.

11 Claims, No Drawings

ICE CREAM WITH COATING CONTAINING LACTIC ACID BACTERIA

This application is a 371 of PCT/EP97/03560, filed Jul. 5, 1997.

TECHNICAL FIELD

The present invention relates to a novel ice cream containing lactic acid bacteria.

STATE OF THE ART

The beneficial properties on human health of certain lactic acid bacteria, commonly known as "probiotic bacteria", are known. For example, EP 577,904 (Sociétéde Produits Nestlé) proposes to prepare milks acidified with the strain *Lactobacillus acidophilus* CNCM I-1225, which is capable of adhering to intestinal cells, of excluding pathogens from the intestinal flora and of improving the immune response to an external attack.

Hekmat et al. also propose to prepare ice creams comprising probiotic bacteria (J. Dairy Science, 75, 1415–1422, 1992). However, it should be noted that most of the bacteria die during chilling of the cream, after expansion of its volume during which a gas is incorporated into the cream and the mixture is subjected to intense mechanical beating, and after freezing of the cream at a negative temperature. There is thus value in searching for means for increasing the final charge of live bacteria in the ice cream since the number of lactic acid bacteria has a direct influence on the beneficial activity of the product.

Moreover, ice creams generally consist of an expanded cream which is coated with a composition which needs to adhere well to the expanded cream, not exude water, be both flexible and crisp, and be stable over time. To satisfy these needs, the composition of a coating is thus usually quite distinct from that of the expanded cream.

U.S. Pat. No. 4,985,263 (Nestec S. A.) proposes, for example, to coat an ice cream with a composition with a low fat content comprising water, an alginate salt, a vegetable gum and a small amount of cocoa. Unfortunately, a coating with a low fat content is usually relatively brittle and does not adhere sufficiently to the ice cream. Furthermore, its taste may not be satisfactory to the average consumer who is used to traditional coatings generally containing more than 30% to 40% fat.

WO 95/21536 (Unilever) describes, for example, another process for the preparation of a coating for ice cream, in which an expanded cream is coated with a prelayer containing 43% to 46% fat, and the precoated expanded cream is coated with a covering of standard composition, the prelayer making it possible to improve the adhesion of the covering to the ice cream.

SUMMARY OF THE INVENTION

The present invention overcomes the drawbacks of the prior art by providing an ice cream whose content of lactic acid bacteria is significantly enriched by means of a novel coating, the coating preferably having a low fat content, a taste reminiscent of a flavor of lactic origin having a buttery note, the capacity to adhere to the ice cream, the capacity of not exuding water, the capacity of being stable over time and the capacity of being both flexible and crisp.

In this respect, the invention relates to an ice cream characterized in that it comprises an expanded and chilled cream, coated over all or part of its outer surface with a non-expanded coating comprising $10^3$ to $10^9$ cfu/g of lactic acid bacteria ("cfu" derives from the expression "colony forming unit").

The invention also covers the use of lactic acid bacteria in the preparation of a cream intended to coat all or part of an ice cream.

DETAILED DESCRIPTION OF THE INVENTION

In the context of the present invention, the term "expansion" will be considered as covering the traditional process in which, simultaneously, a gas is incorporated into a cream and mechanical beating is carried out. Usually, the cream is also simultaneously subjected to a negative temperature. However, it is possible to use certain expanders, such as an expander with beads, "Mondomix" or the like, with which the cream is aerated and beaten and the outlet temperature of the cream is positive.

Similarly, the term "chilling " will be considered as covering the traditional process in which, simultaneously, a gas is incorporated into a cream, mechanical beating is carried out and the mixture is subjected to a negative temperature.

The expanded and chilled cream may have all the compositions chosen by those skilled in the art, provided that it is expanded to a proportion of 20% to 200% by volume.

Preferably, this cream comprises, after expansion and freezing, more than $10^6$ cfu/g of lactic acid bacteria, it being possible for the said bacteria to be chosen from *Lactococcus lactis* species, in particular *L. lactis* subsp. *cremoris* and *Lactis* subsp. *lactis biovar diacetylactis*; *Streptococcus thermophilus*; the group of acidophilic bacteria consisting of *Lactobacillus acidophilus, Lactobacillus crispatus, Lactobacillus amylovorous, Lactobacillus gallinarum, Lactobacillus gasseri* and *Lactobacillus johnsonii*; *Lactobacillus brevis*; *Lactobacillus fermentum*; *Lactobacillus plantarum*; *Lactobacillus helveticus*; *Lactobacillus casei*, in particular *L. casei* subsp. *casei* and *L. casei* subsp. *rhamnosus*; *Lactobacillus delbruckii*, in particular *L. delbruckii* subsp. *lactis,* and *L. delbruckii* subsp. *bulgaricus*; bifidobacteria, in particular *Bifidobacterium infantis, Bifidobacterium breve, Bifidobacterium longum*; and, lastly, *Leuconostoc mesenteroides*, in particular *L. mesenteroides* subsp. *cremoris,* for example (Bergey's Manual of Systematic Bacteriology, vol. 2, 1986; Fujisawa et al., Int. J. Syst. Bact., 42, 487–491, 1992).

In this respect, the probiotic lactic acid bacteria are of particular value in the context of the present invention since these bacteria are capable of adhering to human intestinal cells, of excluding pathogenic bacteria on human intestinal cells, and/or of acting on the human immune system by allowing it to react more strongly to external attack (immunomodulatory capacity), for example by increasing the capacities for phagocytosis of granulocytes derived from human blood (J. of Dairy Science, 78, 491–197, 1995: immunomodulatory capacity of the La-1 strain which was filed under the treaty of Budapest at the Collection Nationale de Culture de Microoganisme (CNCM), 25 rue due Docteur Roux, 75724 Paris, where it was given the file number CNCM I-1225).

By way of example, the probiotic strain *Lactobacillus acidophilus* CNCM I-1225 described in EP 577,904 may be used. This strain has recently been reclassified among the *Lactobacilli johnsonii,* following new taxonomy proposed by Fujisawa et al. who is now the authority in the subject of taxonomy of acidophilic lactobacilli (Int. J. Syst. Bact., 42, 487–791, 1992). Other probiotic bacteria are also available, such as those described in EP 199,535 (Gorbach et al.), U.S. Pat. No. 5,296,221 (Mitsuoka et al.), U.S. Pat. No. 556,785 (Institut Pasteur) or U.S. Pat. No. 5,591,428 (Probi AB), for example.

Preferably, lactic acid bacteria which produce texturing polysaccharides, such as, for example, those described in U.S. Pat. No. 5,733,765 and EP 96201535.0 are also used. Without wishing to be limited by scientific theory, it appears that texturing polysaccharides are in fact involved in the capacity of the coating to adhere to the ice cream and to be both flexible and crisp.

Many methods are available to those skilled in the art in order to prepare an expanded ice cream comprising live lactic acid bacteria. In this respect, the processes described in DD 154424, EP 438,201, SU 1374465, FR 24,23,163, NL 9000101, U.S. Pat. No. 4,293,573, U.S. Pat. No. 4,308,287 and U.S. Pat. No. 5,112,626 may be incorporated by way of reference into the description of the present invention, a person skilled in the art being capable of adapting them in order to carry out the present invention.

However, certain preparation processes are more suitable for ensuring a large number of live lactic acid bacteria in expanded ice cream.

In this respect, a neutral gas can be incorporated during the expansion, such as $CO_2$ or nitrogen, alone or as a mixture, in order to protect the lactic acid bacteria which are oxygen-sensitive.

The cream may also be expanded to 130–200% by volume, after which a milk fermented by lactic acid bacteria may then be incorporated therein in order to reach a final expansion of about 80–150% by volume.

In order to ensure a large number of live lactic acid bacteria in the expanded ice cream, the temperature at the blender outlet is also considered to be an important parameter. For example, a cream expanded to about 95% and cooled to about $-3°$ C. at the blender outlet contains significantly more live La-1 bacteria ($10^7$ cfu/g) than a cream expanded to about 95% and cooled to about $-6°$ C., which contains about 2 to 10 times less (5 to $1 \times 10^6$ cfu/g). This difference is maintained after hardening of the ice cream and after 1, 3 and 6 months of storage at $-30°$ C.

Another advantage which is incidental to the addition of a fermented milk during manufacture of an expanded ice cream is to develop a very smooth, very creamy texture even if the fat content is less than or equal to 8%, and to develop a flavor of lactic origin having a buttery note. This creamy texture is maintained for several weeks during tests of accelerated ageing (successive temperature cycles spread out over 24 h corresponding to stages at $-10°$ C., $-20°$ C. and $-30°$ C., and then at $-30°$ C., $-20°$ C. and $-10°$ C.). The expanded ice cream containing a fermented milk also has very good resistance in the melting test (measurement of the weight of molten ice cream as a function of time, when the ice cream is maintained in a chamber at $+20°$ C.). For example, after more than two hours of melting test, only 40% to 50% of the ice cream is in liquid form, the remainder being maintained in the form of a foam. Furthermore, the size of the ice crystals, which have a direct influence on the "smooth" nature of the ice cream, also varies very weakly (about 1 to 10 $\mu$m for the average diameter of the crystals) between the start and the end of the accelerated ageing. The advantage of this good resistance in the melting test and of the maintenance of the creamy texture during storage and of the low variation in the size of the ice crystals during accelerated ageing is, for example, to be able to fill an edible support such as a wafer in the shape of a cone, and to form a "flame" about 50 mm in height, and then to be able to retain this "flame" shape during storage.

The expanded ice cream is then coated, in a conventional manner, with a coating comprising lactic acid bacteria in fresh, concentrated, dry or encapsulated form, chosen from the species mentioned above.

Preferably, at least part of the coating has been fermented by one or more species of lactic acid bacteria. The reason for this is that the larger the amount of fermented part in the coating, the more the capacity of the coating to adhere to the ice cream and to be flexible and crisp is increased. Moreover, a coating having a lactic flavor note is particularly appealing.

After the expanded ice cream has been chilled and then coated, the coating comprises from $10^3$ to $10^9$ cfu/g of lactic acid bacteria, but preferably at least $10^6$ cfu/g.

The coating may be carried out conventionally by spraying, dipping or moulding, for example. By way of example, the coating techniques described in U.S. Pat. No. 4,985,263, WO 95/21536 and FR 2,680,635 are incorporated by way of reference into the description of the present invention.

The invention has the advantage that an ice cream may be enriched with live lactic acid bacteria since the lactic acid bacteria contained in the ice cream undergo not only expansion but also passage of the negative temperature. On the other hand, the lactic acid bacteria of the coating do not undergo the expansion, but only the freezing. Consequently, the coating may comprise a larger number of lactic acid bacteria per gram, than the expanded ice cream. The ratio (e/g) between the number of lactic acid bacteria in the coating (e) and the number of lactic acid bacteria in the expanded cream (g) may thus be easily greater than 1, preferably greater than 2, for example.

In a first embodiment of the invention, the coating may be enriched with a fermented composition. This coating may thus comprise 1% to 70% of a milk fermented with lactic acid bacteria, 0.5% to 5% of animal or vegetable proteins and a fat content of from 2% to 20%, it being possible for the said fat to be of lactic origin, the fermented milk generally comprising $10^4$–$10^9$ cfu/g of lactic acid bacteria, and it being possible for the said proteins to be egg yolk proteins or milk serum proteins. It may be noted that it is not necessary to add vegetable or non-vegetable fat-rich compounds in order to obtain fat contents close to 40%, since the oral texture of the frozen coating according to the invention is effectively reminiscent of that of a traditional frozen coating having from 40% to 50% vegetable fat.

In a second embodiment of the invention, the coating may be directly fermented in total. For this, a composition comprising at least 1% to 70% of a milk, 0.5% to 5% of animal or vegetable proteins and a fat content of from 2% to 20% is prepared and this composition is fermented to at least $10^6$ cfu/g. As a guide, the milk may be a milk which is reconstituted from a whole- or skimmed-milk concentrate or powder.

In a third embodiment of the invention, the coating may be simply enriched with lactic acid bacteria in concentrated form (by centrifugation of a culture medium and recovery of the pellet), dried form (by freeze-drying or by spraying under a flow of hot air) or encapsulated form (see below).

The coating may have a sweetening power of from 5 to 35 (relative value equivalent to sucrose) obtained with sugars or sweeteners, such as glucose, fructose, sucrose, lactose, invert sugars and/or aspartame. Moreover, the coating may comprise 0.1% to 10% of a polysaccharide, which may be hydrolyzed or modified, such as starches, pectins, dextrans, gums such as xanthan, and alginates, for example. Noteworthy stabilities of the coating with respect to freezing-thawing cycles are obtained if an acetylated starch, for example one which is from about 1% to 3% acetylated, or a hydrolyzed starch having a dextrose equivalent content of about 15 to 25, is used in particular.

An ice cream which fully satisfies the conditions stated above may thus comprise an expanded ice cream part comprising more than $10^6$ cfu/g of lactic acid bacteria, and a coating part comprising more than $5 \times 10^6$ cfu/g of lactic acid bacteria, 0.1% to 10% of an acetylated starch, 1% to 60% of a milk, 0.5% to 5% of animal or vegetable proteins, a sucrose content of from 15% to 30% and a lactic fat content of from 2% to 20%, for example. Furthermore, the best results are obtained with the strain *Lactobacillus acidophilus* CNCM I-1225 and/or the strains *Streptococcus thermophilus* CNCM I-1421 and CNCM I-1424 (filed at the Institut Pasteur, 25 rue du Docteur Roux, Paris, on 18.05.1994).

Moreover, the coating may also comprise fibers which will not be, or will be only sparingly, digested in the stomach and the intestinal tract, but which can nevertheless be fermented specifically by the lactic acid bacteria mentioned above, thus making it possible to restore or promote an adapted flora of lactic acid bacteria which are beneficial for human health.

These fibers may be of protein or saccharide nature, chosen, for example, from vegetable pectins, chito-, fructo-, gentio-, galacto-, isomalto-, manno- or xylo-oligosaccharides or soybean oligosaccharides, (Playne et al., Bulletin of the IDF 313, Group B42, Annual Session of September 95, Vienna).

The preferred pectins are polymers of $\alpha$-1,4-D-galacturonic acid having a molecular weight of about 10 to 400 kDa, which may be purified from carrots or tomatoes, (JP 60164432). The preferred galacto-oligosaccharides comprise a saccharide part consisting of 2 to 5 repeating units of structure [-$\alpha$-D-Glu-(1$\rightarrow$4)-$\beta$-D-Gal-(1$\rightarrow$6)-] (Yakult Honsa Co., Japan). The preferred fructo-oligosaccharides are inulin-oligofructoses extracted from chicory, which may comprise, for example, 1-9 repeating units of structure [-$\beta$-D-Fru-(1$\rightarrow$2)-$\beta$-D-Fru-(1$\rightarrow$2)-] (WO 94/12541; Raffinerie Tirlemontoise S.A., Belgium), or oligosaccharides synthesized from sucrose units which may comprise, for example, a saccharide part consisting of 2 to 9 repeating units of structure [-$\alpha$-D-Glu-(1$\rightarrow$2)-$\beta$-D-Fru-(1$\rightarrow$2)-] (Meiji Seika Kasiha Co., Japan). The preferred malto-oligosaccharides comprise a saccharide part consisting of 2 to 7 repeating units of structure [-$\alpha$-D-Gal-(1$\rightarrow$4)-] (Nihon Shokuhin Kako Co., Japan). The preferred isomaltoses comprise a saccharide part consisting of 2 to 6 repeating units of structure [-$\alpha$-D-Glu-(1$\rightarrow$6)-] (Showa Sangyo Co., Japan). The preferred gentio-oligosaccharides comprise a saccharide part consisting of 2 to 5 repeating units of structure [-$\beta$-D-Glu-(1$\rightarrow$6)-] (Nihon Shokuhin Kako Co., Japan). Lastly, the preferred xylo-oligosaccharides comprise a saccharide part consisting of 2 to 9 repeating units of structure [-$\beta$-xyl-(1$\rightarrow$4)-] (Suntory Co., Japan).

The amount of fibers depends on their capacity to promote the growth of lactic acid bacteria. As a general rule, the coating may contain from 0.1 to 20% of such fibers (on a weight basis relative to the solids), in particular at least $10^3$ cfu of lactic acid bacteria per g of fibers, preferably $10^4$ to $10^7$ cfu/g of fibers. Moreover, the ice cream may be designed so as to be able potentially to provide up to a maximum of 10 g of fibers per dessert. Larger amounts of fibers in fact induce an unpleasant sensation of heaviness on the stomach (Bouhnik et al., Cah. Nutr. Diét., 6, 418–422, 1991; Ito et al., Microb. Ecol. Health Dis., 3, 285–292, 1990).

Preferably, the lactic acid bacteria are not substantially in contact with the fibers, thereby avoiding an untimely start of fermentation of the fibers during the preparation of the dessert (when the ice cream is fermented), or during its storage due in particular to the problems of variation of the storage temperature during summer periods.

In this respect, it has been found that micro-encapsulation of the bacteria has undeniable therapeutic and technical advantages. Firstly, micro-encapsulation significantly increases the survival of the lactic acid bacteria and thus the number of live lactic acid bacteria which arrive into the intestine. Secondly, these bacteria are not released into the coating when it is subjected to a temperature such that a start of fermentation is normally observed. Even more importantly, the lactic acid bacteria are gradually released into the intestine, thereby allowing a prolonged action of the lactic acid bacteria on human health.

Preferably, in order to encapsulate the lactic acid bacteria, they are dried by freeze-drying or by spraying (U.S. patent application Ser. No. 08/877,801 filed Jun. 18, 1997) and they are incorporated into a gel formed, for example, of a solidified fatty acid, a sodium alginate, polymerized hydroxypropylmethyl-cellulose or polymerized polyvinylpyrrolidone. In this respect, the teaching given in FR 2,443,247 (Sociétédes Produits Nestlé) is incorporated into the description of the present invention by way of reference.

Similarly, it has been observed that the fiber concentration in the intestine slows down the intestinal transit of the fibers, which has a positive influence on the growth of the lactic acid bacteria in the intestine. In other words, the less concentrated the fibers are in the ice cream according to the invention, for example by mixing them only with the expanded cream, the poorer is the bacterial growth in the intestine. The fact of concentrating the fibers in the form of a coating thus makes it possible to potentiate the beneficial effect of the lactic acid bacteria on human health.

Lastly, another incidental problem solved by the present invention lies in the fact that certain fibers are very readily degraded by acidic pH, in particular by the pH of a cream fermented by lactic acid bacteria. Insofar as the coating has simply been enriched with a fermented milk (unfermented coating in total), or with concentrated, dry or encapsulated lactic acid bacteria, the pH of the coating thus has the advantage of not being greater than 5.

In order to obtain an ice cream whose technical and taste characteristics fully satisfy the needs of the present invention, it is not necessary for all of the lactic acid bacteria still to be live, although their presence effectively has a genuine beneficial effect on the consumer's health. Indeed, it is also possible to use one of the coating compositions described above, the only difference being that it is inactivated beforehand so as to reduce the number of bacteria to less than $10^3$ cfu/g. For this, the composition intended to coat the ice cream may be pasteurized by heat or under high pressure, without the taste of the final coating or its adhesion and flexibility properties being adversely affected.

EXAMPLE

The present invention is described in greater detail in the examples presented below. The percentages are given on a weight basis except where otherwise indicated. It goes without saying, however, that these examples are given by way of illustration of the subject of the invention, of which they do not in any way constitute a limitation. The strains used, purely by way of example, *Lactobacillus johnsonii* La-1, *Bifidobacterium longum* B116, *Streptococcus thermophilus* Sfi9 and Sfi21, were filed under the treaty of Budapest at the Collection Nationale de Culture de Microoganisme (CNCM), 25 rue due Docteur Roux, 75724 Paris, France, on Jun. 30, 1992 (La-1, B116) and May 18, 1994 (Sfi9, Sfi21) respectively, and were assigned file numbers CNCM I-1225, CNCM I-1228, CNCM I-1421 and CNCM I-1424 respectively.

Example 1

Expanded ice cream comprising an addition of fermented milk.

In this example, the source of fermented milk is an acidified milk, sold in France under the brand name "natural" LC$^1$® (Sociétédes Produits Nestlé, France), comprising about $10^7$ cfu/ml of the probiotic strain *Lactobacillus acidophilus* CNCM I-1225 (referred to hereinbelow as La-1), and about $10^8$ cfu/ml of each texturing strain *Streptococcus thermophilus* Sfi9 and Sfi21. Any other fermented, pasteurized or unpasteurized milk may also be added to the ice cream base, in a proportion of from +1% to 50%, or the coating base, in a proportion of from 1 to 70%, for example.

A concentrated ice cream base is prepared by mixing, at 60–65° C. for 20 min, about 11% lactic fats, 8.8% milk solids (non-fat), 25% sucrose, 5% glucose syrup and 0.6% Emulstab® SE30. The base is homogenized at 72–75° C. and at 210 bar (2 stages at 210/50 bar), it is pasteurized at 85° C. for 22 sec (APV pasteurizer, France, Evreux, 400 l/h), it is cooled to 4° C. and 40% of commercial acidified milk LC$^1$® is added thereto. The composition of this concentrated base is presented in Table 1 below.

TABLE 1

| Ingredients | Composition (kg) | Fats (%) | Non-fat solids (%) | Sucrose (%) | Solids content (%) |
|---|---|---|---|---|---|
| Cream (35%) | 31.43 | 11.00 | 1.57 | | 12.57 |
| Powdered skimmed milk | 7.60 | | 7.30 | | 7.30 |
| Sucrose | 36.77 | | | 25.00 | 25.00 |
| Glucose syrup | 5.27 | | | | 5.00 |
| Emulstab ® SE30 | 0.67 | | | | 0.63 |
| Water | 18.26 | | | | |
| Total: cream base | 100.00 | 11.00 | 8.87 | 25.00 | 50.50 |
| Cream base (60%) | 60.00 | 6.60 | 5.32 | 15.00 | 30.30 |
| LC$^1$ ® (40%) | 40.00 | 1.40 | 4.68 | — | 6.08 |
| Total: cream + LC$^1$ ® | 100.00 | 8.00 | 10.00 | 15.00 | 36.38 |

After maturing the base for 12 h at 4° C., it is chilled to a degree of expansion of 95% by volume (Crepaco chilling machine, France, Evreux; 160 l of product/h), after which all or part of the expanded cream is then coated, according to the methods described below, with the various coating compositions described in Examples 3 to 5 below.

In order to prepare a molded block, the standard technique of "shell and core" filling is used. To this end, the coating according to Example 3 is measured out into a mold, which is in a bath of glycol-water at −35° C. After 30 s, the non-frozen coating is drawn off by suction. Only the frozen coating remains in the mold, in order to form a shell. The 95% expanded ice cream, leaving the chilling machine at −3° C., is then measured into the shell. After waiting for 30 min, the block is removed from the mold. It is then sprayed with spring water, packaged, placed in a hardening chamber at −40° C. for 3 hours and then stored in a chamber at −30° C.

In order to prepare an extruded block, the 95% expanded ice cream, leaving the chilling machine at −5° C./−6° C., is extruded with an extruder having an extrusion head of the desired shape. The extruded block is then frozen in a freezing tunnel at −45° C. The block is then coated by dipping into the composition described according to Example 4. It is then sprayed with spring water, packaged, placed in a hardening chamber at about −40° C. for 3 hours and then stored in a chamber at −30° C.

In order to prepare a pot of ice cream, the 95% expanded ice cream, leaving the chilling machine at −5° C./−6° C., is extruded with an extruder having an extrusion head of the desired shape, into 12 cl pots. The pattern, whose composition is described in Example 5 below, is measured out and deposited on the surface of the expanded ice cream. The pot is placed in a hardening chamber at about −40° C. for 3 hours and is then stored in a chamber at −30° C.

After hardening, the number of live bacteria in the expanded ice cream and in the coating are determined, by plating out dilutions of samples on an MRS-agar medium (DE Man et al., 1960) supplemented with an antibiotic and by counting the number of La-1 colonies which grow on it.

The results show that the population of La-1, after hardening, in the expanded ice cream in pots is about $2 \times 10^6$ cfu per gram. The population of lactic acid bacteria fluctuates relatively little during storage of the ice cream for several months at freezing temperatures. For example, after 6 months of storage at −30° C., the number of bacteria in the expanded ice cream part in pots is about $1 \times 10^6$ cfu/g.

The results show that the population of La-1, after hardening, in the extruded or moulded expanded ice cream in block form is about $1.3 \times 10^6$ cfu per gram. When the expanded ice cream block is coated (molding or dipping), the bacterial population over the total product is then about $8.6 \times 10^6$ cfu per gram. In this case, the coating thus makes it possible to enrich the expanded ice cream with lactic acid bacteria.

The chilled blocks and the pots are also subjected to successive temperature cycles spread over 24 h, corresponding to stages at −10° C., −20° C. and −30° C. and then at −30° C., −20° C. and −10° C. The ice cream is then subjected to an accelerated ageing. The survival of the bacteria over time is then analyzed. In the ice creams in pots, only a small decline, of about 18%, in the number of lactic acid bacteria after 3 months of accelerated ageing is observed. Similar results are observed for the chilled blocks.

The capacity of the coating to adhere to the ice cream and to be flexible and crisp is evaluated by a tasting panel. During the tastings, the block which has undergone the successive temperature cycles, for 1, 2, 3 or 4 months, is compared with a control block which has been freshly stored at −30° C. The results show that for the blocks coated with the coverings described in Examples 3 and 4, no adverse changes, as regards the adhesion, the flexibility or the crispness, are observed by the tasting panel after 1 month of accelerated ageing. For comparison, a block coated with a chocolate coating containing 40% to 60% vegetable fat suffers no adverse changes in the course of such an accelerated ageing.

Example 2
Expanded and Fermented Ice Cream

A cream comprising 10.8% lactic fats, 13.5% milk solids (non-fat), 0.3% Emulstab® SE30 and 0.3% Emulstab® foam (Grindsted, DK) is prepared, it is pasteurized at 105° C. for 20 s, homogenized at 75° C. and 300 bar, cooled to 38° C. and inoculated with precultures in MRS medium, taken in exponential growth phase, at a rate of 5% by weight of a preculture of La-1, and 0.5% by weight of a preculture of the strain *Streptococcus thermophilus* Sfi21. The cream is then fermented for 10 h at 38° C. up to a pH of about 4.5. At the end of the fermentation, sucrose and a glucose syrup are added thereto. The composition of the cream is presented in Table 2 below.

The mixture is then beaten, cooled to 4° C., stored at 4° C., chilled to a degree of expansion of 95° by volume (Crepaco chilling machine, France; 160 l of product/h), and then partially or totally coated according to the methods described in Example 1, and with the various coating compositions described in Examples 3 to 5 below.

After hardening, the number of live bacteria in the expanded ice creams is about $7 \times 10^6$ cfu/g, and after storage for 3 months at −30° C. this value is about $6 \times 10^6$ cfu/g.

An enrichment of the bacterial population in the total product is also observed in the chilled and coated blocks. When the block of expanded ice cream is coated by molding or dipping, the bacterial population over the total product is then about $10^7$ cfu per gram after 6 months of storage. The coating thus allows the expanded ice cream to be enriched in lactic acid bacteria in this case also.

The chilled blocks and the pots subjected to accelerated ageing as described in Example 1 survive particularly well, since less than 50% of the lactic acid bacteria die.

The capacity of the coating to adhere to the ice cream and to be flexible and crisp is also evaluated by a tasting panel, according to the method described in Example 1. The results show that for the blocks coated with the coverings described in Examples 3 and 4, after 1 month of accelerated ageing, no adverse changes regarding the adhesion, the flexibility or the crispness are observed by the tasting panel.

TABLE 2

| Ingredients | Composition (kg) | Fats (%) | Non-fat solids (%) | Sucrose (%) | Solids content (%) |
|---|---|---|---|---|---|
| Cream (35%) | 30.83 | 10.79 | 1.54 | | 12.33 |
| Powdered skimmed milk | 12.45 | | 11.95 | | 11.95 |
| Emulstab ® SE30 | 0.41 | | | | 0.37 |
| Emulstab ® foam | 0.41 | | | | 0.36 |
| Water | 55.91 | | | | |
| Total: cream base | 100.00 | 10.79 | 13.49 | — | 25.01 |
| Cream base | 74.14 | 8.00 | 10.00 | — | 18.54 |
| Sucrose | 22.06 | | | 15.00 | 15.00 |
| Glucose syrup | 3.80 | | | | 3.00 |
| Fermented ice cream | 100.00 | 8.00 | 10.00 | 15.00 | 36.54 |

Example 3
Egg-free Cream Base for "Shell and Core"-type Coating

This example again takes, in Table 3, the composition of the non-expanded egg-free cream base for "shell and core"-type coating, used to coat the moulded expanded ice creams described in Examples 1 and 2. In this example, the fermented milk LC$^1$® was added to the base in a proportion of 40%. Any other fermented milk may be used, in a proportion of from 1 to 70%.

TABLE 3

| Ingredient | Weight (g) | Supplier |
|---|---|---|
| Sweetened concentrated milk containing 9% fat | 36.7 | |
| Liquid sugar, 68% MS | 4.78 | |
| Invert sugar syrup 2/3 | 10.28 | |
| Atomized glucose syrup 36/40 | 9.56 | |
| Modified corn starch H Colflo 67 | 1.1 | National Starch, US |
| LGC450 | 1.5 | New Zealand Milk Product, NZ |
| Tartaric acid | 0.145 | |
| Lemon sauce 98/21 | 0.8 | Ciprial, France |
| Paateurized dairy cream containing 35% fat | 33.6 | |
| Water | 1.535 | |
| Total: BASE | 100 | |
| BASE | 60 | |
| Fermented milk (LC$^1$ ®) | 40 | |
| TOTAL | 100 | |

Example 4
Egg-free Cream Base for "Dipping"-type Coating

This example again takes, in Table 4, the composition of the egg-free, non-expanded cream base for "dipping"-type coating, used to coat the extruded expanded ice creams described in Examples 1 and 2. In this example, the fermented milk LC$^1$® was added to the base in a proportion of 40%. Any other fermented milk may also be used, in a proportion of from 1 to 70%.

TABLE 4

| Ingredient | Weight (g) | Supplier |
|---|---|---|
| Sweetened concentrated milk containing 9% fat | 22.91 | |
| Liquid sugar, 68% MS | 2.98 | |
| Invert sugar syrup 2/3 | 6.42 | |
| Atomized glucose syrup 36/40 | 5.97 | |
| Modified corn starch H Colflo 67 | 0.9 | National Starch, US |
| LGC450 | 1.5 | New Zealand Milk Product, NZ |
| Tartaric acid | 0.09 | |
| Lemon sauce 98/21 | 0.5 | Ciprial, France |
| Pasteurized dairy cream containing 35% fat | 21 | |
| Water | 37.71 | |
| Total: BASE | 100 | |
| BASE | 60 | |
| Fermented milk (LC$^1$ ®) | 40 | |
| TOTAL | 100 | |

Example 5
Cream Base for Decorating an Ice Cream in a Pot

This example again takes, in Table 5, the composition of the non-expanded cream base containing egg for decorating, used to decorate the extruded expanded ice creams in pots described in Examples 1 and 2. In this example, the fermented milk LC$^1$® was added to the base in a proportion of 40%. Any other fermented milk may be used, in a proportion of from 1 to 70%.

TABLE 5

| Ingredient | Weight (g) | Supplier |
|---|---|---|
| Sweetened concentrated milk containing 9% fat | 22 | |
| Liquid sugar, 68% MS | 3 | |
| Invert sugar syrup 2/3 | 4.45 | |
| Atomized glucose syrup 36/40 | 4 | |
| Modified corn starch H Colflo 67 | 4 | National Starch, US |
| Liquid egg yolk | 26.7 | Ferme Du Pré |
| Tartaric acid | 0.09 | |
| Lemon sauce 98/21 | 0.5 | Ciprial, France |
| Water | 35.26 | |
| Total: BASE | 100 | |
| BASE | 60 | |
| Fermented milk (LC$^1$ ®) | 40 | |
| TOTAL | 100 | |

Example 6
Encapsulation of Lactic Acid Bacteria 80 l of culture medium having the composition below are prepared in a 100 l tank: 0.25% of yeast extract, 1.00% of trypticase, 0.50% of phytone, 1.5% of glucose, 0.05% of L-cysteine HCl 0.25% of $K_2HPO_4$, 0.025% of $ZnSO_4$ and traces of $FeCl_3$, the remainder being water.

This culture medium is inoculated with 1 l of a 20-h culture of *Bifidobacterium longum* B116. The medium is incubated for 12 h at 30° C. The culture broth is centrifuged and 240 g of cells are harvested. They are diluted in 250 ml of skimmed milk supplemented with 7% lactose. The mixture is frozen in liquid nitrogen. It is freeze-dried at 40° C. overnight. A 5% dispersion of the powder obtained in hydrogenated vegetable fat having a melting point of 42° and liquefied at 45° C. is prepared. The dispersion is injected at 45° C. and at a pressure of 4 bar, at the same time as liquid nitrogen, in a proportion of 1 part of dispersion per 5 parts of nitrogen, into the top of a vertical cylinder 1.5 m in diameter and 10 m in height. At the bottom of the cylinder is placed a receptacle containing liquid nitrogen, in which bifido-bacteria-containing microbeads whose diameter ranges between 0.1 and 0.5 mm are collected. The microbeads are then placed in a fluidized bed and an alcoholic solution containing 8% zein is sprayed onto the bed in an amount such that the layer of zein formed around the microbeads represents 5% of their weight.

The microbeads are then incorporated into the "shell and core" coating composition described in Table 5 above, so as to obtain about $10^7$ cfu per gram. The ice cream described in Example 2 is then coated with this composition.

Example 7
Coating Based on Fibers and Lactic Acid Bacteria

The concentrated base described in Example 1 is prepared and 40% of a milk fermented by the strains *Lactobacillus johnsonii* La-1 ($10^7$ cfu/ml) and *Bifidobacterium longum* B116 ($10^7$ cfu/ml) are added thereto. After maturing the cream for 12 h at 4° C., it is chilled to a degree of expansion of 95% by volume (Crepaco chilling machine, France, Evreux; 160 l of product/h) and all or part of the expanded cream is then coated with the two coating compositions described below.

TABLE 6

For shell and core coating

| Ingredient | Weight (g) | Supplier |
|---|---|---|
| Sweetened concentrated milk containing 9% fat | 30.7 | |
| Liquid sugar, 68% MS | 4.78 | |
| Actilight ® 950P fructo-oligosaccharide | 10 | Beghin Meiji, FR |
| Invert sugar syrup 2/3 | 9.28 | |
| Atomized glucose syrup 36/40 | 6.56 | |
| Modified corn starch H Colflo ® 67 | 1.1 | National Starch, US |
| LGC450 | 1.5 | New Zealand Milk Product, NZ |
| Tartaric acid | 0.145 | |
| Lemon sauce 98/21 | 0.8 | Ciprial, France |
| Pasteurized dairy cream containing 35% fat | 33.6 | |
| Water | 1.535 | |
| Total: BASE | 100 | |
| BASE | 60 | |
| Acidified milk | 40 | |
| TOTAL | 100 | |

TABLE 7

For coating by dipping

| Ingredient | Weight (g) | Supplier |
|---|---|---|
| Sweetened concentrated milk containing 9% fat | 20.91 | |
| Liquid sugar, 68% MS | 2.98 | |
| Galacto-oligosaccharide P7L | 6.42 | Snow Brand Milk Product; JP |
| Invert sugar syrup 2/3 | 4 | |
| Atomized glucose syrup 36/40 | 3.97 | |
| Modified corn starch H Colflo ® 67 | 0.9 | National Starch, US |
| LGC450 | 1.5 | New Zealand Milk Product, NZ |
| Tartaric acid | 0.09 | |
| Lemon sauce 98/21 | 0.5 | Ciprial, France |
| Pasteurized dairy cream containing 35% fat | 21 | |
| Water | 37.71 | |
| Total: BASE | 100 | |
| BASE | 60 | |
| Acidified milk | 40 | |
| TOTAL | 100 | |

After hardening, the number of live bacteria in the expanded creams and in the coatings is determined. The results are comparable to those presented in Example 1.

Lastly, the capacity of the coated blocks to promote the growth of the lactic bacteria La-1 and B116 in the intestine is also demonstrated, by determining the number of La-1 and B116 present in the feces after several days following regular consumption of about 200 ml, i.e. about 100 g, of ice cream per day, this being with regard to a fiber-depleted diet.

What is claimed is:
1. A frozen ice cream comprising an expanded and chilled cream, coated over all or part of its external surface with a non-expanded coating comprising $10^3$ to $10^9$ cfu/g of live lactic acid bacteria.

2. The ice cream according to claim 1, wherein the expanded cream comprises more than $10^6$ cfu/g of lactic acid bacteria, the ratio (e/g) between the number of lactic acid bacteria in the coating (e) and the number of lactic acid bacteria in the expanded cream (g) being greater then 1.

3. The ice cream according to claim 1, wherein the coating comprises 1% to 70% of a milk fermented by lactic acid bacteria, 0.5% to 5% of animal or vegetable proteins and a milk fat content of from 2% to 20%.

4. The ice cream according to claim 3, wherein the coating further comprises 0.1% to 10% of a hydrolyzed or modified polysaccharide.

5. The ice cream according to claim 4, wherein the modified polysaccharide is an acetylated starch, or in that the hydrolyzed polysaccharide is a starch having a dextrose equivalent content of about 15 to 25.

6. The ice cream according to claim 1, wherein the expanded cream comprises more than $10^6$ cfu/g of lactic acid bacteria and in that the coating comprises more than $5 \times 10^6$ cfu/g of lactic acid bacteria, 0.1% to 10% of an acetylated starch, 1% to 60% of a milk, 0.5% to 5% of animal or vegetable proteins and a fat content of from 2% to 20%.

7. The ice cream according to claim 1, wherein the coating comprises fermentable fibers which specifically support growth, in the human intestinal tract of lactic acid bacteria initially contained in the coating.

8. The ice cream according to claim 7, wherein the fibers are pectins, fructo-, galacto-, gentio-, chito-, isomalto-, manno-, or xylo-oligosaccharides or soybean oligosaccharides.

9. The ice cream according to claim 1, comprising the strain *Lactobacillus acidophilus* CNCM I-1225.

10. The ice cream according to claim 1, wherein the lactic acid bacteria in the coating are added in concentrated, dry or encapsulated form.

11. A frozen ice cream comprising an expanded cream coated over all or part of its surface with a non-expanded coating, wherein the coating is obtained by fermentation of at least part of the coating composition with live lactic acid bacteria, followed by an inactivation of the lactic acid bacteria so as to reduce the number of bacteria to a range of $10^3$ to $10^9$ cfu/g.

* * * * *

UNITED STATES PATENT AND TRADEMARK OFFICE
CERTIFICATE OF CORRECTION

PATENT NO.   :   6,022,568

DATED        :   February 8, 2000

INVENTOR(S)  :   Corinne Lesens et al.

It is certified that error appears in the above-identified patent and that said Letters Patent is hereby corrected as shown below:

On the title page at "[30] Foreign Application Priority Data: change "[CH] Switzerland" to --[EP] European Pat. Off.--.

Column 13, line 5 (claim 2, line 5): change "then" to --than--.

Signed and Sealed this

Twelfth Day of December, 2000

Q. TODD DICKINSON

Attest:

Attesting Officer

*Director of Patents and Trademarks*